J. F. REINERT.
AUTOMATIC WEIGHING MACHINE.
APPLICATION FILED APR. 15, 1918.

1,276,958.

Patented Aug. 27, 1918.
2 SHEETS—SHEET 1.

Inventor,
John F. Reinert,
BY
Charles Turner Brown,

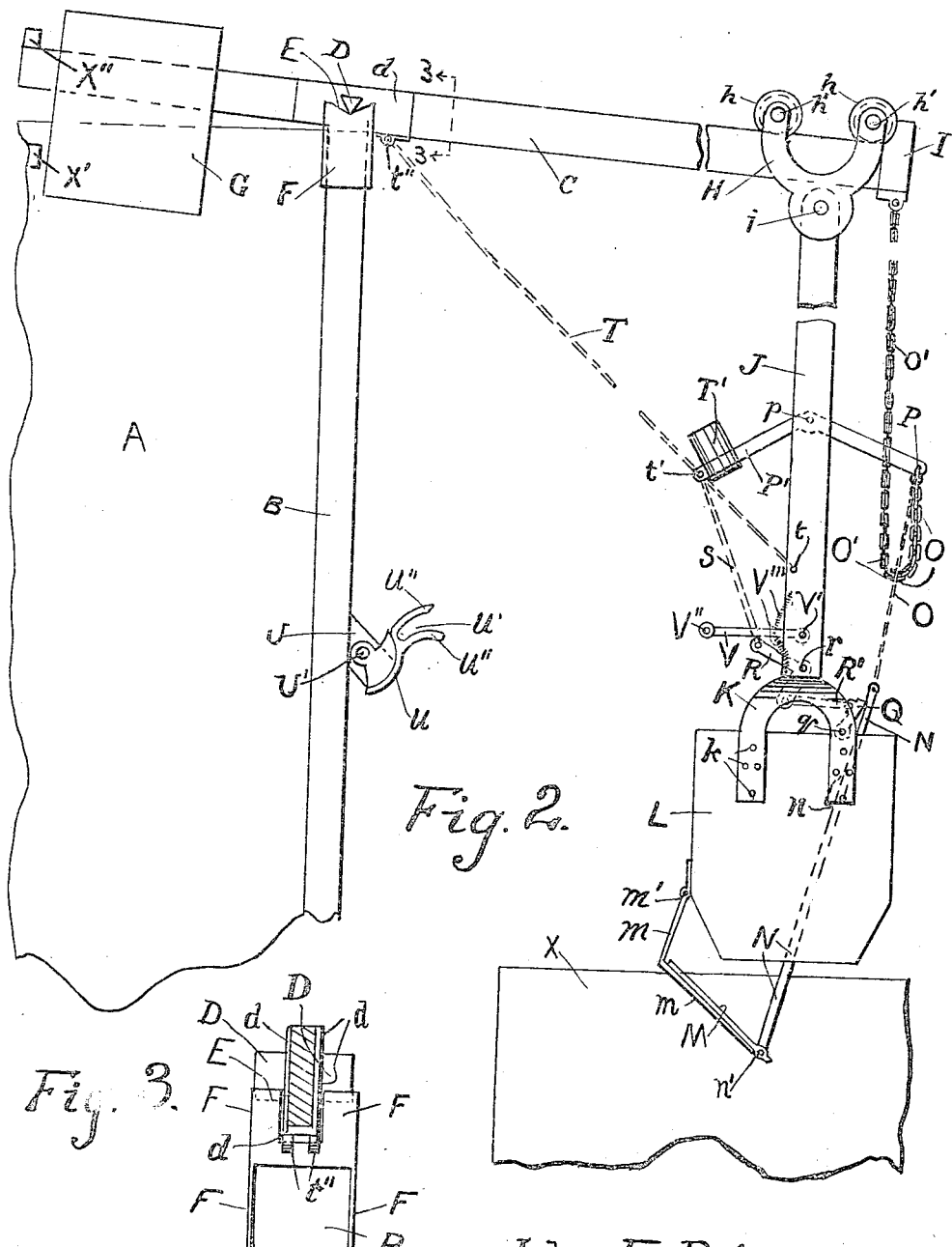

UNITED STATES PATENT OFFICE.

JOHN F. REINERT, OF SOUTH ELGIN, ILLINOIS.

AUTOMATIC WEIGHING-MACHINE.

1,276,958.

Specification of Letters Patent.  Patented Aug. 27, 1918.

Application filed April 15, 1918.  Serial No. 228,560.

*To all whom it may concern:*

Be it known that I, JOHN F. REINERT, residing at South Elgin, in the county of Kane and State of Illinois, have invented certain new and useful Improvements in Automatic Weighing-Machines, of which the following, when taken in connection with the accompanying drawing, is a full and complete specification.

This invention relates to an apparatus whereby material stored in a bin, as sand, gravel, wheat and the like, is automatically transferred to a gondola car or other receptacle and concurrently therewith is automatically weighed.

The apparatus illustrated is particularly adapted for the continuous transfer of sand and gravel from a bin to a gondola car, the operation of the device in receiving and discharging the several loads required to effect the transfer of a predetermined quantity of material being continuous and automatic and the weighing of said material being effected automatically as said loads are transferred.

The objects of the invention are to obtain a combined transferring and weighing apparatus which will operate automatically to transfer from one receptacle to another, a plurality of loads of material, each load comprising a predetermined weight of said material; to obtain an apparatus of the kind named which is simple in construction, consisting of few parts, economically made, not liable to break or get out of order; adapted to "handle" a considerable weight of material in each load, and easily understood and operated.

I have illustrated a construction embodying my invention in the drawings referred to in which, Figure 1, is a side elevation with the several movable parts in a loading position.

Fig. 2, is a side elevation with the said parts in an unloading position;

Fig. 3, is a vertical sectional view on an enlarged scale, on line 3—3 of Fig. 2 viewed in the direction indicated by the arrows.

Figures 1, 4:
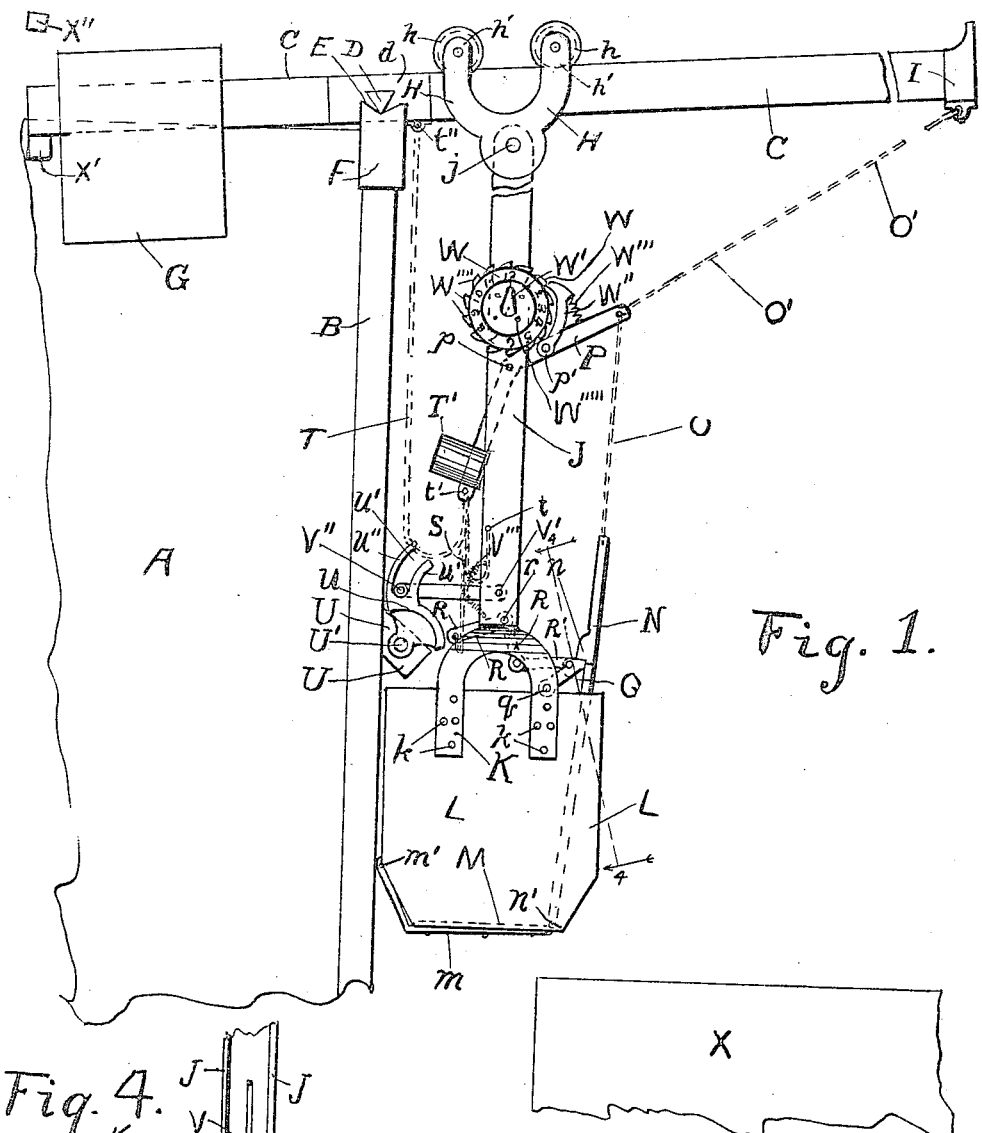
Fig. 4 is a section on line 4—4 of Fig. 1, viewed as indicated by the arrows.

A reference character applied to designate a given part indicates said part throughout the several figures of the drawings, wherever the same appears.

A, represents a portion of an end wall of a bin or other receptacle. B, represents a vertical post which is illustrated as being built into the front wall of receptacle A. C, represents a weighing beam which is provided with the abutments D, the knife edges whereof are adapted to rock on the upper V-shaped ends E of base F. The base F is mounted on the upper end of post B. G, represents a weight or counter-balance, which is adjustably mounted on weighing beam C; said adjustability consisting in its being slidably mounted on said weighing beam; H a carriage movably mounted on said weighing beam. I, indicates an abutment which forms a stop limiting the travel of carriage H when carrying a loaded receptacle, on weighing beam C, and it is also illustrated as the means for attaching a flexible connection hereinafter described to one end of said beam.

The carriage H is provided with the pulleys $h$ which are rotatably mounted on the axles $h'$ so as to be adapted to travel on the upper edge of weighing beam C. J represents a connecting beam which is attached at its upper end by pivot $j$ to carriage H, and at its lower end by connection K to receptacle L. $k$, $k$, represent rivets or bolts attaching said connection K to receptacle L.

The bottom of receptacle L is the closed door M, as is illustrated in Fig. 1. Said door is illustrated as open in Fig. 2, $m$ representing the hinges on which the door turns, and $m'$ the pintle of said hinges. N, represents a connection which is provided with the abutment $n$, and is attached at its lower end by pin or bolt $n'$ to the door M. At its upper end connection N is attached to flexible connection O, (said connection O being preferably a chain). The upper end of the connection O is attached to part P of lever P P', and O' is a flexible connection which is attached to said part of lever P P', and to abutment I. Lever or arm P P' is pivotally mounted as at $p$ on the connecting beam J. Q represents a latch pivotally mounted on rod $q$ which is adapted, when advanced, to engage with the abutment $n$, (the door M being closed, as illustrated in Fig. 1), to retain said door in a closed position. To retract latch Q, thereby disengaging it from abutment $n$, I mount the bell crank R on pivot $r$ in connecting beam J, and provide link R' joining one end of said bell crank to said latch, the connection S and flexible connection T. The lower end of the flexible connection T, which is preferably a chain similiar to chain O, and is indicated by broken lines in Figs. 1 and 2, is illustrated as attached to connecting beam J, as by pin, t, to the end P of lever P' as by pin t' and at its upper end to weighing beam C as by pin t'' and member d. T' represents a weight on lever P P'. U represents a down spout which is arranged to be closed by gate u when said gate is turned on its pivot U' into substantially the position thereof illustrated in Fig. 2, and which is open, permitting the discharge therethrough of material from receptacle A, when said gate is in the position in which it is illustrated in Fig. 1 of the drawings. The gate u is provided with the U-shaped recess u' which is obtained by means of arms u'', u'' extending outward from said gate. V represents a lever pivotally mounted, as by pivot V', on connecting beam J. Lever V is provided with an abutment (preferably the rotatably mounted pulley V''), which is arranged to engage with the recess u' when the receptacle L approaches to, and is in, a loading position, as illustrated in Fig. 1 of the drawing. V''' represents springs which yieldingly hold lever V in position so that abutment V'' engages with recess u' on the said approach to said loading position.

The position of the gate u is controlled by the lever V to the extent of being opened thereby on the approach of connecting beam J and receptacle L to a loading position and closed thereby on said receptacle moving away from said loading position toward the position in which it is illustrated in Fig. 2. W, Fig. 1 represents a rotatably mounted dial and W' a rigidly mounted hand in front of said dial. Said dial is illustrated as mounted to be turned by dog W'' which is pivoted on lever P, by pin p', to indicate the number of loads which the receptacle L has transferred from receptacle or bin A to the car (which is diagrammatically indicated). W''' represents a spring which yieldingly holds dog W'' in contact with a tooth W''''. The disk having the teeth W'''' thereon is connected to the dial W as by pins W'''''. X', X'', represent end views of abutments or stops which limit the movement of weighing beam C. One end of said weighing beam rests, when said weighing beam is in the position which is illustrated in Fig. 1 of the drawings, on abutment X', and said weighing beam is illustrated in Fig. 2 in contact with the under side of said abutment X''.

The operation of the device is, the several parts and members being in the position in which they are illustrated in Fig. 1 of the drawings, sand or other material may flow from spout U into the receptacle L until the load on beam C, which comprises the contents of said receptacle, together with the weight of the receptacle, the connecting beam J and the hereinbefore recited members which are mounted on or attached to said receptacle and beam, move the counterbalance (the weight G, in its adjusted position), and rocks weighing beam C on the knife edges of abutments D, from the position which is illustrated in Fig. 1 of the drawings to the position illustrated in Fig. 2.

The carriage H will then travel down the inclined weighing beam to the position thereof which is illustrated in Fig. 2. As said carriage leaves the position in which it is illustrated in Fig. 1 the abutment V'' in recess u' will turn gate u on pivot U' thereby closing downspout U and no further flow of material from said downspout will occur until said gate is turned to an opened position.

As said receptacle approaches said position illustrated in Fig. 2 of the drawing, the connections T and S turn bell crank R, to withdraw latch Q from engagement with abutment n and the material in the receptacle L forces door M downward and opens it, and said material flows from said receptacle. As said material flows from said receptacle the weight of counter balance G returns or restores weighing beam C to the position thereof which is illustrated in Fig. 1 of the drawings, and carriage H with connecting beam J, will roll down the inclined weighing beam, carrying therewith the connecting beam and receptacle L with the several parts and members connected thereto.

As the carriage H travels from the end of the weighing beam at which it is illustrated in Fig. 2 of the drawing toward the position thereof in which it is illustrated in Fig. 1 of the drawings, the flexible connections O and the connection N will close the door M which forms the bottom of receptacle L and latch Q will engage with the abutment n to latch said door in a closed position.

As said carriage H approaches the position thereof which is illustrated in Fig. 1 of the drawings the abutment V'' will enter recess u' and will turn gate u on pivot U' to an open position as illustrated in Fig. 1 and the flow of material from bin A through said spout U into receptacle L will be resumed.

The foregoing operations of loading and unloading said receptacle L will be automatically repeated so long as said carriage H is permitted to travel down the inclined weighing beam C toward and sufficiently close to the bin A to open said gate u in the manner described, and hence to stop the continuous operation of the apparatus it is simply necessary to stop the travel of said carriage as it approaches receptacle A before said abutment V'' opens said gate u.

In the foregoing recited apparatus when the several parts are in the position which is illustrated in Fig. 2 of the drawings a portion of the weight of connection O' is carried by lever P' and is counter balanced by weight T'. As receptacle L moves from its position as illustrated in Fig. 2 toward the position thereof which is illustrated in Fig. 1, the weight of connection O' is transferred from said lever to weighing beam C, and at the same time some of the weight of connection T is transferred to end P' of said lever P P'. The transfer of weights of connections O' and T, last above recited is sufficient to cause weight T to turn said lever on fulcrum $p$ and close door M before receptacle L is in position to receive material flowing from down spout U and before the abutment V'' commences to open gate $u$. The turning of lever P, P', as above recited also, by means of connection S moves bell crank R on its pivot or fulcrum $r$, to turn latch Q into position to engage with abutment $n$ to retain said door in closed position.

It will be observed that the flexible connections O' and T respectively prevent swaying of connecting beam J and receptacle L, as the carriage H stops at its limit of travel to and from the fulcrum (abutments D), on which the weighing beam C rocks.

I claim:—

1. In an automatic weighing machine, a lever, a pivotal mounting therefor, a weight adjustably mounted on said lever to one side and a carriage movably mounted on said lever to the other side of said pivotal mounting, means to limit the travel of said carriage when moving away from said pivotal mounting, a receptacle suspended from said carriage, means to supply material to said receptacle, means to arrest said supply, means to discharge material from said receptacle, means to close said discharging means and to maintain said closed position, and means to release said maintaining means on the predetermined travel of said carriage.

2. In an automatic weighing machine, a lever, rocking means to said lever, a weight adjustably mounted on said lever to one side and a carriage movably mounted on said lever to the other side of said rocking means, means to limit the travel of said carriage when moving away from said rocking means, a receptacle suspended from said carriage, means to supply material to said receptacle, means arranged to be automatically actuated on the movement of said receptacle away from loading position to arrest said supply, and to be automatically actuated to renew said supply on the return of said receptacle, to said loading position, means to discharge material from said receptacle, means to close said discharging means and to maintain said closed position, and means to release said maintaining means on the predetermined travel of said carriage.

3. In an automatic weighing apparatus, a weighing beam fulcrumed to rock to a predetermined angle above and to a predetermined angle below a horizontal plane, a counter balance and a carriage on said beam, said carriage arranged to travel to predetermined positions on said beam, said travel controlled by the angle position of said beam, in combination with a connecting beam depending from and pivotally attached to said carriage, a receptacle attached to said connecting beam and means to limit the swaying of said connecting beam and receptacle on the arrival of said carriage to said predetermined positions.

4. In an automatic weighing apparatus, a weighing beam fulcrumed to rock to a predetermined angle above and to a predetermined angle below a horizontal plane, a counter balance and a carriage on said beam, said carriage arranged to travel to predetermined positions on said beam in combination with a connecting beam depending from and pivotally attached to said carriage, a receptacle attached to said connecting beam and means to limit the swaying of said connecting beam and receptacle on the arrival of said carriage to said predetermined positions, a bottom to said receptacle, means to close said bottom on the travel of said carriage a predetermined distance toward said fulcrum, means to latch said bottom in a closed position, and means to release said latch on the travel of said carriage a predetermined distance from said fulcrum.

5. In an automatic weighing machine, a lever, rocking means to said lever, said means comprising coacting abutments, a weight adjustable mounted on said lever to one side and a carriage movably mounted on said lever to the other side of said rocking means, means to limit the travel of said carriage when moving away from said rocking means, a receptacle, means to suspend said receptacle from said carriage, means, comprising a spout, to supply material to said receptacle, means comprising a shut off to arrest said supply, means mounted on said suspending means to actuate said shut off on the travel of said carriage, means to discharge material from said receptacle, means to close said discharging means and to maintain said closed position, and means to automatically release said maintaining means on the predetermined travel of said carriage.

6. In an automatic weighing apparatus, a weighing beam fulcrumed to rock to a predetermined angle above and to a predetermined angle below a horizontal plane, a counter balance and a carriage on said beam, said carriage arranged to travel to predetermined positions on said beam, said travel controlled by the angle position of said beam, in combination with a connecting beam, depending from and pivotally attached to said carriage, a receptacle attached to said connecting beam, a bottom to said receptacle, means, comprising a flexible connection attached thereto and to said weighing beam to close said bottom, means, comprising a weighted lever connected to said flexible connection, to time the closing of said bottom, and means to latch said bottom in its closed position.

7. In an automatic weighing apparatus, a weighing beam fulcrumed to rock to a predetermined angle above and to a predetermined angle below a horizontal plane, a counter balance and a carriage on said beam, said carriage arranged to travel to predetermined positions on said beam, said travel controlled by the angle position of said beam, in combination with a connecting beam, depending from and pivotally attached to said carriage, a receptacle attached to said connecting beam, a bottom to said receptacle, means, comprising a flexible connection attached thereto and to said weighing beam to close said bottom, means, comprising a weighted lever connected to said flexible connection, to time the closing of said bottom, and means to latch said bottom in its closed position, and means, comprising an additional flexible connection, to release said latch on the travel of said carriage a predetermined distance away from said fulcrum.

8. In an automatic weighing machine, a lever, rocking means to said lever, said means comprising coacting abutments, a weight adjustably mounted on said lever to one side and a carriage movably mounted on said lever to the other side of said rocking means, means to limit the travel of said carriage when moving away from said rocking means, a receptacle suspended from said carriage, means, comprising a spout to supply material to said receptacle, means comprising a shut off to arrest said supply, means to discharge material from said receptacle, means to close said discharging means and to maintain said closed position, and means to automatically release said maintaining means on the predetermined travel of said carriage.

JOHN F. REINERT.

In the presence of—
 CHARLES TURNER BROWN,
 EDWARD J. ROCHE.

Copies of this patent may be obtained for five cents each, by addressing the "Commissioner of Patents, Washington, D. C."